United States Patent [19]
Moore et al.

[11] Patent Number: 5,176,745
[45] Date of Patent: Jan. 5, 1993

[54] AQUEOUS INK COMPOSITION AND COLORANTS USEFUL THEREIN

[75] Inventors: Patrick D. Moore, Pacolet; Clifford R. King, Taylors; Raj Batlaw, Spartanburg, all of S.C.

[73] Assignee: Milliken Research Corporation, Spartanburg, S.C.

[21] Appl. No.: 806,926

[22] Filed: Dec. 11, 1991

[51] Int. Cl.$^5$ .................. C09D 11/00; C09B 69/10
[52] U.S. Cl. ...................... 106/22 R; 8/647; 8/673; 534/729; 106/22 D; 106/22 H; 106/22 K
[58] Field of Search ............ 106/22; 8/647, 673; 534/729

[56] References Cited
U.S. PATENT DOCUMENTS

| | | | |
|---|---|---|---|
| 3,157,633 | 11/1964 | Kuhn et al. | 260/200 |
| 4,167,510 | 9/1979 | Brendle | 260/174 |
| 4,284,729 | 8/1981 | Cross et al. | 521/158 |
| 4,507,407 | 3/1985 | Kluger et al. | 521/113 |
| 4,640,690 | 2/1987 | Baumgartner et al. | 8/506 |
| 4,732,570 | 3/1988 | Baumgartner et al. | 8/506 |
| 4,871,371 | 10/1989 | Harris | 8/403 |
| 4,981,516 | 1/1991 | Kluger et al. | 106/22 |
| 5,030,697 | 7/1991 | Hugl et al. | 525/326 |
| 5,043,013 | 8/1991 | Kluger et al. | 106/22 |
| 5,059,244 | 10/1991 | King et al. | 106/21 |
| 5,062,893 | 11/1991 | Adamic et al. | 106/22 |

*Primary Examiner*—William R. Dixon, Jr.
*Assistant Examiner*—Margaret Einsmann
*Attorney, Agent, or Firm*—Timothy J. Monahan; H. William Petry

[57] ABSTRACT

An aqueous ink composition is provided having up to 50 wt. % of a colorant of the formula:

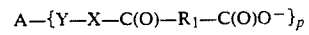

$$A-\{Y-X-C(O)-R_1-C(O)O^-\}_p$$

where A is an organic chromophore; Y is a polyoxyalkylene substituent; X is a radical of a reactive hydroxy, amino or thio group; and $R_1$ is $C_{2-30}$, substituted or unsubstituted alkylene, alkenylene, or phenylenealkylene. A counter ion selected from alkaline metal ions, alkaline earth metal ions, ammonium ions, amine salts, and zinc ammonium complexes is present in approximately stoichiometric proportion or greater relative to the colorant in the ink composition.

15 Claims, No Drawings

AQUEOUS INK COMPOSITION AND COLORANTS USEFUL THEREIN

BACKGROUND OF THE INVENTION

This invention relates generally to an aqueous ink composition containing a colorant which is soluble as a salt, but is relatively water insoluble in its acid form. In particular, the colorant is a polyoxyalkylene substituted organic chromophore which has been reacted with a cyclic acid anhydride, dicarboxylic acid or derivative thereof, to provide a pendant carboxyl group.

Polyoxyalkylene substituted organic chromophores are well known in the art as exemplified by Brendle, U.S. Pat. No. 4,167,510 (fugitive tints), Baumgartner et al., U.S. Pat. No. 4,732,570 (colorants for thermoplastic resins) and Cross et al., U.S. Pat. No. 4,284,729 (colorants reactive into polyurethane resins). Additionally, fugitive colorants within the aforementioned class have been employed in children's marking pens due to their water solubility, which allows for easy removal of the colorant from skin, clothes, painted surfaces, etc. In many ink applications, however, it is essential that the colorant in the ink composition remain permanently affixed to the substrate to which it is applied.

The water solubility of dyestuffs may also be enhanced by grafting such dyestuffs to a water soluble polymer backbone as disclosed in Hugl et al., U.S. Pat. No. 5,030,697. Suitable polymer backbones include co-polymers of a acrylamide with unsaturated dicarboxylic acid anhydrides. Hugl et al. also provide a DNA or antigen reactive group grafted on to the polymer for linking the polymer bound dye to a biologically active material.

The gravure and flexographic printing industries are important areas of ink application requiring a high degree of integrity and permanence of printed images. Typical processes are based upon compositions containing a volatile organic solvent, such as toluene, a resin binder and a pigment or dye to impart color. After the ink composition is applied to a substrate, the solvent is evaporated or absorbed, and the pigment or dye is affixed to the substrate by the binder. Concerns for the environment and limiting worker exposure to organic solvents have increased pressure on the printing industry to develop aqueous based ink compositions. Despite the availability of a number of water soluble dyes and other colorants, such colorants remain essentially water soluble after application and, therefore, lack the permanence found in organic solvent based ink compositions.

SUMMARY OF THE INVENTION

Therefore, one of the objects of this invention is to provide an aqueous ink composition.

Another object of this invention is to provide an aqueous ink composition having a colorant which is soluble therein.

Still another object of this invention is to provide a colorant which, after the ink has dried on a suitable substrate, is substantially less water soluble.

Accordingly, an aqueous ink solution is provided having a colorant characterized by a polyoxyalkylene substituted, organic chromophore wherein the polyoxyalkylene substituent is covalently bonded to a carboxylic acid. Preferably, a pendant or terminal hydroxy, amino or thio group of the polyoxyalkylene substituent is bonded through an acyl group of the carboxylic acid, provided that the resultant colorant has at least one carboxylic acid functionality. The colorant is soluble in water as a salt and relatively insoluble in its acid form. Therefore, a counter ion selected from alkali metal ions, alkaline earth metal ions, zinc ammonium complexes, ammonium ions and amine salts, is provided in the ink solution in approximately stoichiometric proportion or greater relative to said colorant. Particularly useful counter ions are ammonium ions which may optionally be substituted with from one to three groups selected from $C_{1-18}$ alkyl, $C_{2-18}$ hydroxyalkyl, preferably $C_{1-4}$ alkyl and $C_{2-4}$ hydroxy alkyl, phenyl and alkylphenyl wherein the alkyl portion is $C_{1-4}$, such as amine salts of ethanolamine, diethanolamine and triethanolamine, and amine salts of morpholine. Counter ions which are volatile, comprise a volatile component or which migrate away from the colorant after the ink solution is applied to a substrate are preferred.

The solubility of the colorant is further influenced by the number and type of alkylene oxide radicals comprising the polyoxyalkylene substituent and the contribution of the carboxylic acid. Thus the relative water solubility or insolubility of the colorant in the form of a salt or acid can be adjusted by altering the constituency of the polyoxyalkylene substituent and the carboxylic acid.

DESCRIPTION OF THE PREFERRED EMBODIMENT OF THE INVENTION

Without limiting the scope of the invention, the preferred features of the invention are hereinafter set forth.

The ink compositions of the present invention are aqueous solutions of one or more colorants. The colorants themselves are characterized by three primary components: (1) an organic chromophore having (2) a polyoxyalkylene substituent and (3) a carboxylic acid covalently bonded to the polyoxyalkylene substituent. The colorant is soluble in the aqueous ink solution when the colorant is in the form of a salt.

A wide variety of polyoxyalkylene substituted organic chromophores and their preparation are well known in the art. These materials can be represented by the general formula:

where A is an organic chromophore, Y is a straight or branched polyoxyalkylene substituent comprised of from 1-200 radicals of $C_{2-18}$ alkylene oxides. The chromophore is covalently bonded to the polyoxyalkylene substituent by a linking group such as N, $NR_3$, O, S, $SO_2$, $SO_2N$, $SO_2NR_3$, $CO_2$, CON or $CONR_3$, where $R_3$ is H, $C_1$-$C_{12}$ alkyl, phenyl or benzyl. Preferably, the linking group is N, $NR_3$, O, $SO_2N$ or $SO_2NR_3$. Two polyoxyalkylene substituents may be bonded to the chromophore through a trivalent linking group. The letter "p" represents the number of polyoxyalkylene chains per chromophore and may be from 1-6, preferably 1-4.

In a preferred embodiment, the polyoxyalkylene substituents are primarily comprised of from 3 to 50 radicals of ethylene oxide, propylene oxide or random and block copolymers thereof. Minor amounts of glycidol, butylene oxide and other compatible monomers may also be present.

A wide variety of organic chromophores are suitable for use in the present invention. Examples of useful chromophores include: nitroso, nitro, azo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine or indigoid chromophore groups. Of particular interest are azo, methine, triphenylmethanes and anthraquinone chromophores. While metal containing chromophores, such as phthalocyanines, may also be employed, from an environmental perspective, their use is less desirable.

Synthesis of organic chromophores containing polyoxyalkylene substituents are disclosed in Kuhn, U.S. Pat. No. 3,157,633, Brendle, U.S. Pat. No. 4,167,510, Cross et al., U.S. Pat. No. 4,284,729 and Baumgartner et al., U.S. Pat. No. 4,732,570, incorporated by reference herein.

The polyoxyalkylene substituted organic chromophore is reacted with a carboxylic acid or derivative thereof to create a covalent bond. Preferably, the polyoxyalkylene substituent has a pendant or terminal nucleophilic functionality selected from OH, $NH_2$, $NHR_2$ and SH, wherein $R_2$ is $C_{1-18}$ alkyl, preferably $C_{1-8}$ alkyl, which reacts to create the bond. In a more preferred embodiment, the nucleophilic functionality is OH or $NH_2$ which is attached to a primary carbon.

The carboxylic acid may be incorporated into the colorant in a number of ways. In one embodiment, a cyclic acid anhydride is reacted with the nucleophilic functionality of the polyoxyalkylene substituent to provide an ester, amide or thio ester bond and a pendant carboxyl group. Suitable cyclic acid anhydrides or equivalent derivatives include succinic anhydride, maleic anhydride, phthalic anhydride, trimellitic anhydride and dimethyl succinate. In a preferred embodiment, the oleophilic character of the colorant is increased by providing an anhydride with a substituent having up to 30 carbon atoms. By way of example, the substituent may be $C_1$-$C_{30}$ alkyl, cycloalkyl or alkenyl, phenyl, naphthyl or benzyl. Particular useful anhydrides include: alkenyl succinic anhydrides such as octenyl succinic anhydride (OSA), dodecenyl succinic anhydride (DDSA) and octadecenyl succinic anhydride (ODSA); itaconic anhydride, citraconic anhydride, succinic anhydrides bonded to rosins and maleated rosins such as "Unirez" available from Union Carbide.

Alternatively, a polycarboxylic acid derivative such as a diacyl halide may be reacted with the nucleophilic functionality of the polyoxyalkylene substituent to form an ester, amide or thio ester. Standard esterification techniques known in the art may be used followed by hydrolysis of the unreacted acyl halide to form a carboxylic acid functionality.

A further embodiment of the invention may be realized by the reaction of a polycarboxylic acid, such as malonic acid, adipic acid and sebacic acid, with the nucleophilic functionality of the polyoxyalkylene substituent to create an ester, amide or thio ester.

The above mentioned cyclic acid anhydrides, acyl halides and dicarboxylic acids may be substituted with CN, $NO_2$, halogens, and $SO_3$ without deviating from the scope of the invention.

The colorant may be broadly represented by the formula:

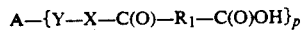

$$A-\{Y-X-C(O)-R_1-C(O)OH\}_p$$

where A is an organic chromophore; Y is a polyoxyalkylene substituent having from 1 to 200 alkylene oxide radicals of $C_{2-18}$ alkylene oxides; X is a nucleophile selected from O, $NR_2$ and S, where $R_2$ is H or $C_{1-18}$ alkyl; $R_1$ is selected from alkylene, alkenylene, phenylene (exemplified by ethylene, vinylene and o-phenylene, respectively) and phenylenealkylene, any of which may optionally be substituted with alkyl, alkenyl or aryl, provided that the total number of carbon atoms is from 2 to 30; and p is an integer from 1 to 6.

An aqueous ink composition incorporating from 0.1 to 50 wt. % of the colorant, preferably from 0.5 to 25 wt. %, may be provided by including a counter ion in approximately stoichiometric proportion to said colorant. The counter ion may be provided in stoichiometric excess. The counter ion converts the colorant to its soluble salt form. As used herein, the colorant is considered to be soluble if it has a solubility in water of at least 1000 ppm. Suitable counter ions include alkali metal ions, alkaline earth metal ions, zinc ammonium complexes such as Zinplex 15 marketed by Ultra Additives, Inc., Patterson, N.J., ammonium ions and amine salts such as salts of morpholine. Especially useful are ammonium ions which may optionally be substituted with from one to three groups selected from $C_{1-18}$ alkyl, $C_{2-18}$ hydroxyalkyl, phenyl and alkylphenyl wherein the alkyl portion is $C_{1-4}$, such as amine salts of ethanolamine, diethanolamine and triethanolamine.

The ink solution may be advantageously applied to any number of substrates including, by way of example, all types of paper, plastic, polymer films and synthetic fibers. In catalog printing operations, the ink solution is applied to paper and dried at temperatures up to 212° F. Counter ions which are fugitive, either because they are volatile or contain volatile components, or because they tend to migrate away from the colorant upon drying are preferred. For reference herein, counter ions having boiling points less than 335° C. are considered volatile.

The aqueous ink composition may also include organic co-solvents such as $C_{1-8}$ alcohols, glycol ethyl ether (Cellosolve ™) and acetates, without deviating from the scope of the invention.

The invention may be further understood by reference to the following examples, but the invention is not intended to be unduly limited thereby. Unless otherwise stated, all parts and percentages are by weight. The abbreviations "EO" and "PO" represent the residues of ethylene oxide and propylene oxide, respectively.

EXAMPLE ONE

A mixture of 16.5 parts of the thiophene based azo colorant described in Example 3 of U.S. Pat. No. 4,507,407, (CV=23.5), 24.0 parts of a blue polymeric triphenylmethane colorant consisting of 4.3 wt. % ethylene oxide polymer and 73.4 wt. % propylene oxide polymer, (CV=49.0), 56.2 parts of a diaryl azo orange colorant containing 28 wt. % ethylene oxide polymer and 46.2 wt. % propylene oxide polymer, (CV=24.1) and 3.3 parts of a methine yellow colorant containing 22.1 wt. % ethylene oxide polymer and 62.4 wt. % propylene oxide polymer, (CV=29.4) were blended with good agitation and warming (40°-50° C.) to prepare a black colorant. To this blend were added 51.3 parts octenylsuccinic anhydride and the reaction mixture heated to 90° C. for 3h under a nitrogen blanket.

An aqueous ink concentrate was prepared from this reaction mixture by adding 45.4 parts of the colored, octenylsuccinic acid derivative slowly and with good agitation and at room temperature to 8.6 parts 30% ammonium hydroxide previously diluted with 146 parts deionized water. This ink concentrate was then used to prepare inks having concentrations of 0-15% by dilution with deionized water.

EXAMPLE TWO

A reaction mixture of the benzothiazole based azo red colorant described by Cross in U.S. Pat. No. 4,284,729, (100 parts) and octenylsuccinic anhydride (62.6 parts; 1.1 equivalents/hydroxyl group) was heated at 90° C. for 3h under nitrogen atmosphere to provide the ester capped polymeric colorant.

An aqueous ink concentrate was prepared from the above reaction mixture by adding 48.4 g of the mixture to a solution of 2.8 g 30% ammonium hydroxide and 141.4 g deionized water to give an ink concentrate of color strength CV=9.5.

EXAMPLE THREE

The colorant blend described in EXAMPLE ONE, 100 g, and 26.5 g of phthalic anhydride (1.1 eq./hydroxyl group), was heated to 90° C. for 3 h with good agitation and nitrogen atmosphere to give the phthalic ester derivatives of the colorant blend.

An aqueous ink concentrate was prepared by adding 38 g of the colorant to a solution of 6.3 g 30% ammonium hydroxide and 155.7 g deionized water.

EXAMPLE FOUR

A mixture of 75.1 parts of the polymeric methine yellow colorant described in EXAMPLE ONE, and 24.9 parts octenylsuccinic anhydride (1.1 eq/hydroxyl group) were heated under an inert atmosphere and with good agitation at 110° C. for 3 hours. To this ester capped colorant of CV=24.3, 4.0 g was added to a solution consisting of 0.5 g 30% ammonium hydroxide in 22.2 g deionized water to give a 15% solids inks concentrate. This ink concentrate was further reduced with water to form a 7.5% solution suitable for ink jet printing.

The following test was performed to determine the stability of the dried ink on paper:

Approximately 1-2 grams of the aqueous ink composition of Example 4 was used to make a printed image using a K-proofer printability tester. The image was allowed to dry at room temperature for 10-15 minutes. The dried image was placed into water and showed no bleed of color.

EXAMPLE FIVE

A mixture of a polymeric diaryl azo orange colorant containing 52.2 wt. % of ethylene oxide polymer, 98 parts, and 171 parts octenylsuccinic anhydride (1.2 eq/hydroxyl group) were combined with strong agitation under an inert atmosphere and the reaction mixture heated to 90° C. for 3h. A 15% aqueous ink concentrate based on color content was prepared from 22.5 g of the OSA modified colorant added to a solution of 7.2 g 30% ammonium hydroxide in 120.3 g deionized water. This concentrate could be diluted further with water to give suitably performing ink jet inks.

EXAMPLE SIX

A mixture of an analog of the polymeric blue colorant described in EXAMPLE ONE but having a polymeric contribution of 51.7 wt. % polymeric ethylene oxide exclusively, 116 g, was heated under an inert atmosphere and with good agitation with 151 g octenylsuccinic anhydride (1.2 eq/hydroxyl group) to give the tetraester-tetracarboxy-blue. An aqueous ink concentrate was prepared containing 15% of the color by adding 22.5 g of the colorant an ammoniacal solution prepared by diluting 6.5 g ammonium hydroxide with 121 g deionized water.

EXAMPLE SEVEN

The blue polyoxyethylene containing colorant used in EXAMPLE SIX, 77.5 g was reacted with 48 g succinic anhydride (1.2 eq/hydroxyl group) at 115° C. for 2.5 h. Similarly, the orange chromogen of EXAMPLE FIVE, 57.4 g, was reacted with 48 g succinic anhydride (1.2 wq/hydroxy group) to give the tetraester-tetracarboxy derivative. Each of these was independently diluted with ammoniacal water (7.2 g 30% ammonium hydroxide in 120.3 g deionized water) to give a 15% solution by adding the colorant slowly and with good agitation to the aqueous diluent.

These 15% ink concentrates could be further reduced with water to a desired color strength suitable for ink jet printing.

EXAMPLE EIGHT 75 parts of the methine yellow colorant of Example 1 was taken with 25 parts of octenylsuccinic anhydride and heated under nitrogen at 95° C. for 3 hours. The resultant colorant (adduct) had a color value of 24.5.

The adduct was taken in a 500 ml. beaker and its Ph adjusted to 8.5 with caustic. Zinplex 15, a zinc crosslinking/complexing agent was slowly added with good agitation. A total of 21 parts of Zinplex 15 were added, which was estimated to provide 30% crosslinking of the polymer.

Next, 0.75 parts of the adduct and Zinplex composition was mixed with 10.5 parts of rosin based varnish to make an ink which, when drawn on paper, gave an image that is completely water resistant.

Additionally, 0.75 parts of the adduct and Zinplex composition was mixed with 10.5 parts of an acrylate emulsion resin to make an ink. The ink was drawn on paper, and the resulting image was completely water resistant.

EXAMPLE NINE 200 parts of the methine yellow colorant of Example 1 was placed in a 3-neck round bottom flask equipped with a mechanical stirrer and a nitrogen inlet. Next, 55 parts (2 moles) of trimellitic anhydride and 0.5 parts of N-methyl imidazole were added and the mixture was heated to 90° C. for 5 hours. The reaction was monitored by IR for disappearance of an anhydride peak at 1830 cm$^{-1}$. The product had a color value of 25.7 and was very viscous.

10 parts of 38% NaOH was added to 50 parts of the above product and the mixture was monitored for an exotherm. The resulting compound was completely water soluble. Finally, water was stripped off the product to 0.5% moisture. One part of the sodium salt of the acid was taken with 21 parts of a rosin-based varnish in toluene to make an ink. The ink was used to make a printed image with a K-proofer printability tester. Putting the image under tap water and holding it for one minute showed no discernable transfer of color to any other part of the paper or the rinse water.

In another experiment, 0.5 parts of the sodium salt was added to 10.5 parts of a Joncryl 87 acrylate resin and 0.5 parts of water. The draw-down image was water resistant. Holding the paper under tap water for one minute resulted in no apparent migration to another part of the paper or to the rinse water.

EXAMPLE TEN 150 parts of p-formyl-N,N-bis(hydroxyalkylpolyoxyalkylene) aniline was taken in a 3-neck roundbottom flask with 297 parts of a rosin based UNIREZ adduct (the adduct before zinc or calcium salt formation of the acid groups) and 1 part of magnesium oxide. The reaction mixture was heated to 240° C. under nitrogen for 24 hours. The reaction was followed by acid number calculation.

To the above product was added 24 parts of ethyl cyanoacetate and 3.5 parts of ammonium carbonate. The reaction mixture was heated for 3 hours under nitrogen, whereupon a yellow colorant was obtained.

To 1.5 parts of this colorant, 10.5 parts of rosin based varnish was added and the mixture used as an ink for a draw-down on paper. The final image was totally water resistant.

There are, of course, many alternate embodiments and modifications which are intended to be included within the scope of the following claims.

What is claimed is:

1. An aqueous ink composition comprising from 0.1 to 50 wt. % of a colorant of the formula:

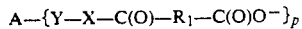

where A is an organic chromophore; Y is a polyoxyalkylene substituent having from 1 to 200 alkylene oxide radicals of $C_{2-18}$ alkylene oxides; X is a nucleophile selected from O, $NR_2$ and S, where $R_2$ is H or $C_{1-18}$ alkyl; $R_1$ is selected from alkylene, alkenylene, phenylene and phenylenealkylene which may optionally be substituted with alkyl or alkenyl, provided that the total number of carbon atoms is between 2 and 30; and p is an integer from 1 to 6; and a counter ion selected from alkali metal ions, alkaline earth metal ions, ammonium ions, zinc ammonium complexes and amine salts, wherein said counter ion is present in approximately stoichiometric proportion or greater relative to said colorant.

2. The ink composition of claim 1 wherein said colorant comprises from 0.5 to 25 wt. % of said ink composition.

3. The ink composition of claim 2 wherein said counter ion is selected from ammonium ions, which may optionally be substituted with from one to three groups selected from $C_{1-18}$ alkyl, $C_{2-18}$ hydroxyalkyl, phenyl and alkylphenyl wherein the alkyl portion is $C_{1-4}$, and amine salts of morpholine.

4. The ink composition of claim 3 wherein A is selected from nitroso, nitro, azo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine or indigoid chromophore groups.

5. The ink composition of claim 4 wherein Y comprises from a total of from 3 to 50 of said alkylene oxide radicals and said alkylene oxides are selected from ethylene oxide and propylene oxide.

6. The ink composition of claim 5 wherein $R_1$ is selected from ethylene, vinylene and phenylene, any of which may optionally be alkyl or alkenyl substituted.

7. The ink composition of claim 2 wherein A is selected from azo, methine, triphenylmethane and anthraquinone chromophores and wherein said counter ion is selected from ammonium ions, and amine salts of morpholine, ethanolamine, diethanolamine and triethanolamine.

8. The ink composition of claim 7 wherein $R_1$ is selected from ethylene, vinylene and phenylene, any of which may optionally be alkyl or alkenyl substituted.

9. The ink composition of claim 8 wherein Y comprises from a total of from 3 to 50 of said alkylene oxide radicals and said alkylene oxides are selected from ethylene oxide and propylene oxide and p is 1 to 4.

10. An aqueous ink composition comprising from 0.1 to 50 wt. % of a colorant characterized by an organic chromophore, having a polyoxyalkylene substituent of from 1 to 200 radicals of alkylene oxide radicals of $C_{2-18}$ alkylene oxides; said polyoxyalkylene substituent having a pendant or terminal group selected from OH, $NH_2$ and $NHR_2$ wherein $R_2$ is $C_{1-18}$ alkyl, which forms an ester or amide linkage respectively with an acyl group of a radical of a cyclic acid anhydride, said anhydride radical having a pendant carboxyl group; and a counter ion selected from alkali metal ions, alkaline earth metal ions, ammonium ions, zinc ammonium complexes and amine salts, wherein said counter ion is present in approximately stoichiometric proportion or greater relative to said colorant.

11. The ink composition of claim 10 wherein said organic chromophore is selected from nitroso, nitro, azo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine or indigoid chromophore groups.

12. The ink composition of claim 11 wherein said polyoxyalkylene substituent comprises from a total of from 3 to 50 of said alkylene oxide radicals and said alkylene oxides are selected from ethylene oxide and propylene oxide, and wherein said anhydride radical is a derivative of succinic anhydride, maleic anhydride, phthalic anhydride or trimellitic anhydride, any of which may be substituted with alkyl or alkenyl, provided that the total number of carbon atoms is between 4 and 32.

13. The ink composition of claim 12 wherein said cyclic acid anhydride is selected from octenyl, dodecenyl or octadecenyl succinic anhydride.

14. The ink composition of claim 12 wherein said pendant or terminal group of said polyoxyalkylene substituent is OH.

15. The ink composition of claim 14 wherein said counter ion is selected from ammonium ions which may be optionally substituted with from one to three groups selected from $C_{1-18}$ alkyl, $C_{2-18}$ hydroxyalkyl, phenyl and alkylphenyl wherein the alkyl portion is $C_{1-4}$, and amine salts of morpholine.

* * * * *